Jan. 12, 1965 R. U. WHITNEY, JR 3,165,139
APPARATUS FOR ORIENTING, FEEDING AND CRIMPING
INSULATED TERMINAL CONNECTORS
Original Filed March 13, 1959 7 Sheets-Sheet 1
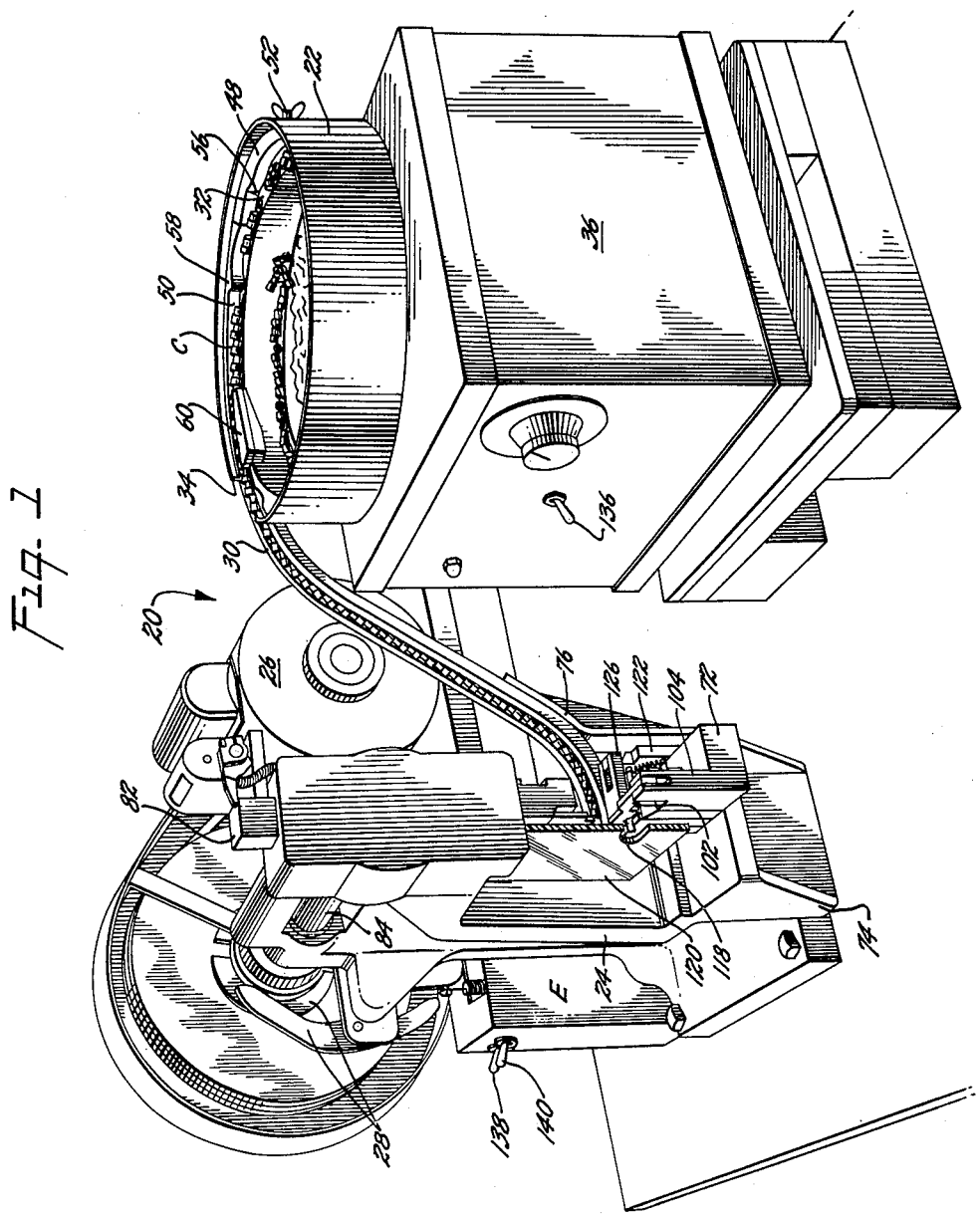
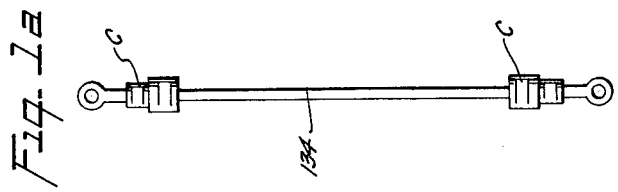
ATTORNEY.

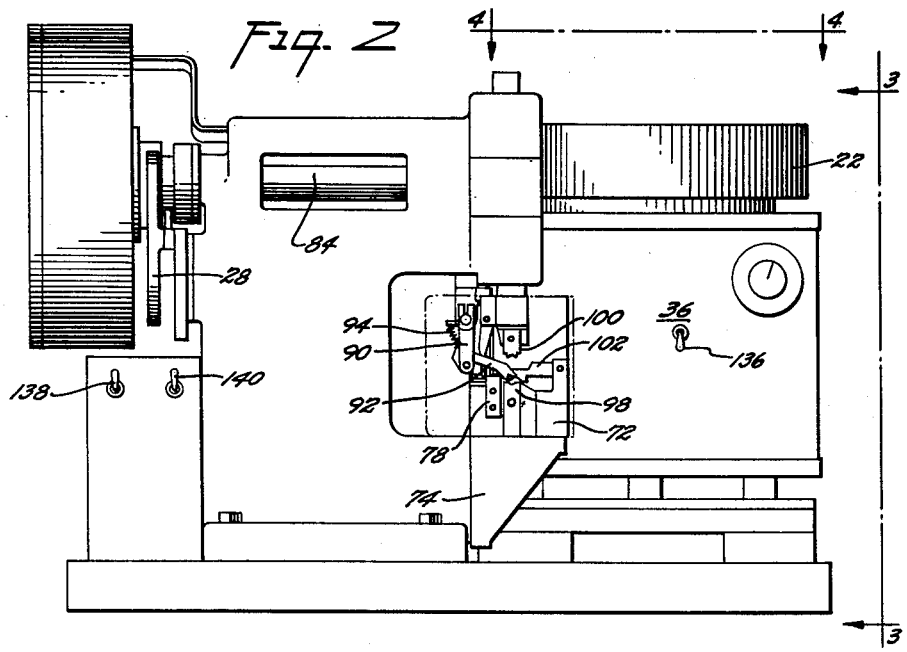
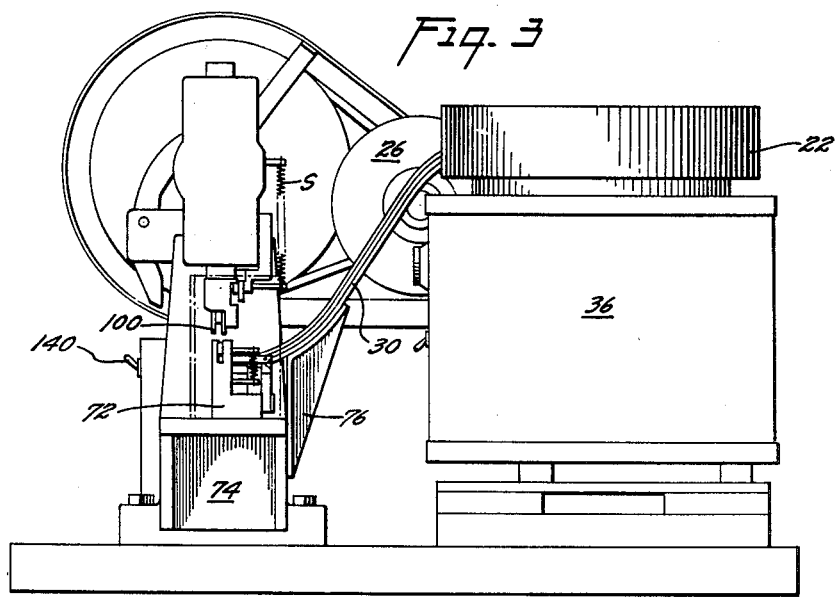

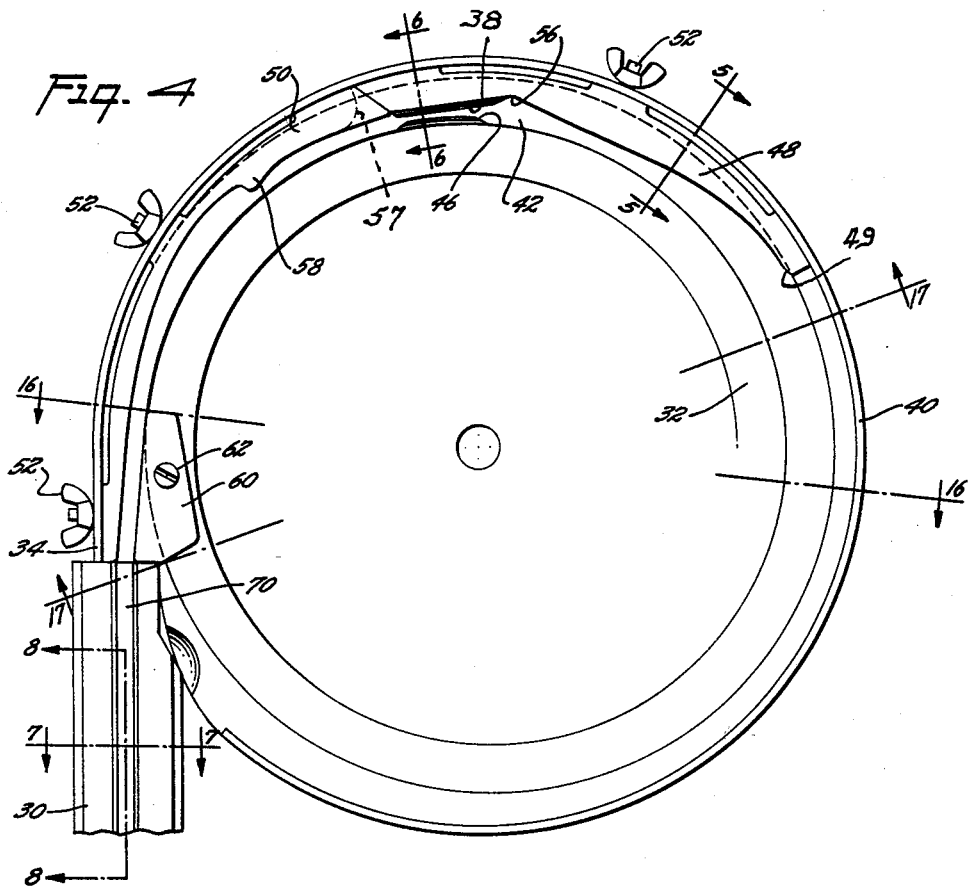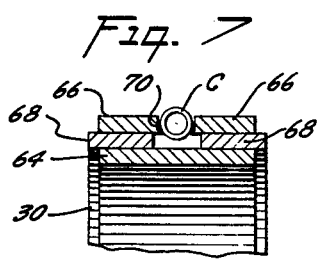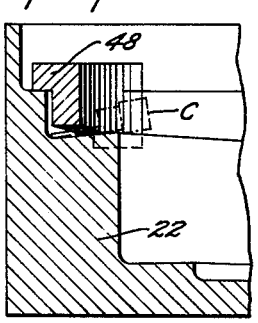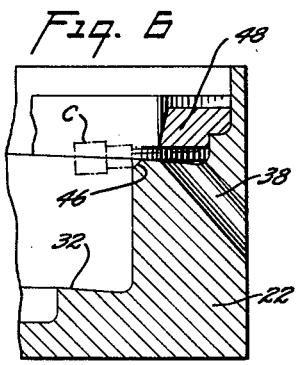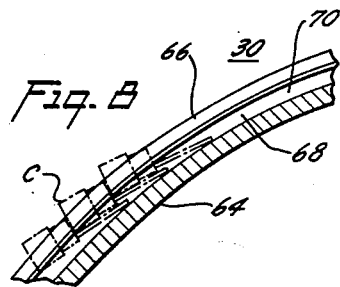

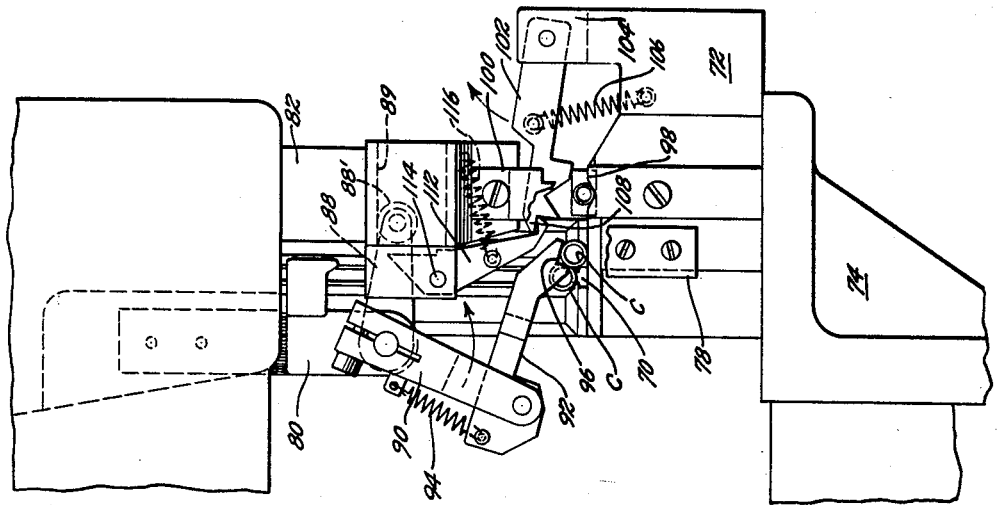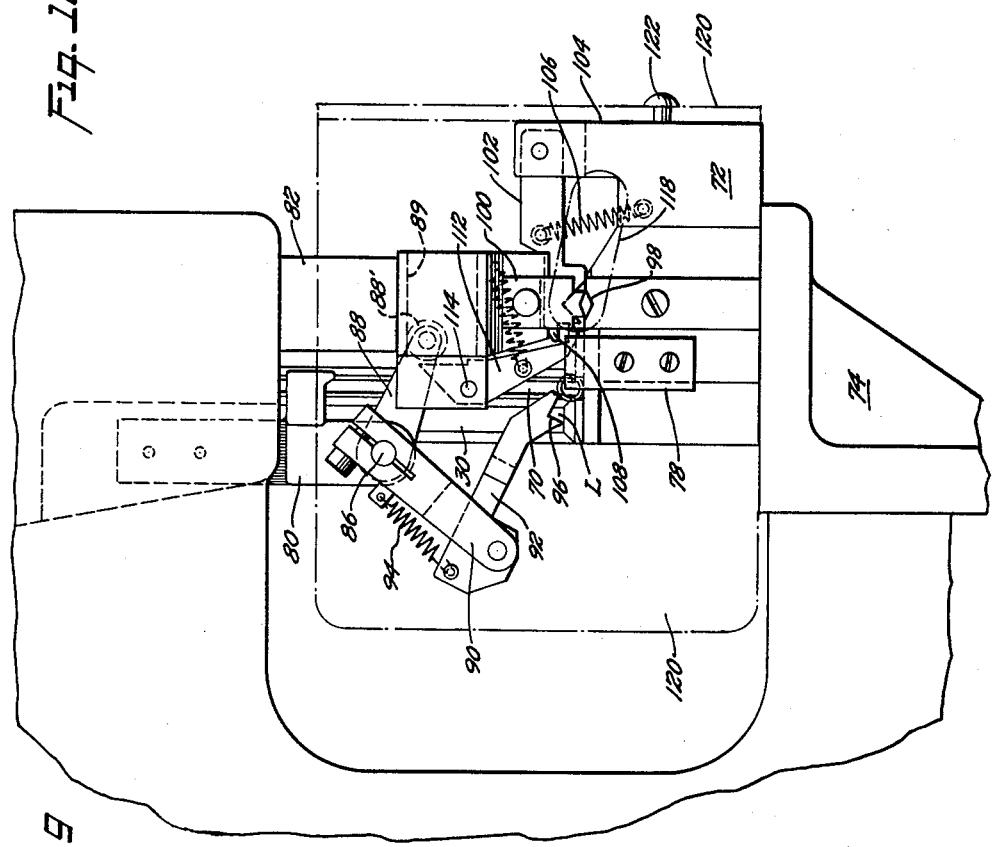

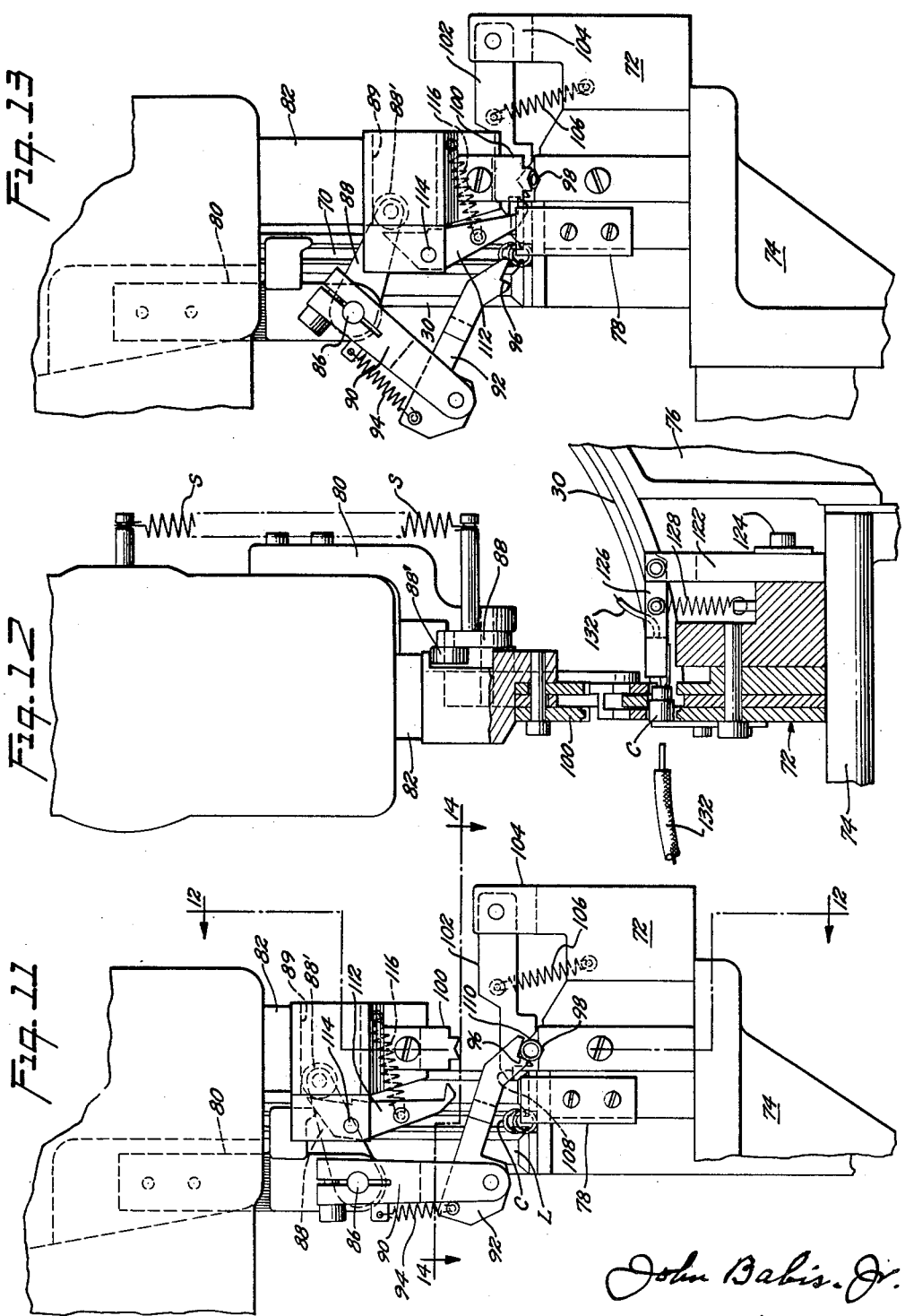

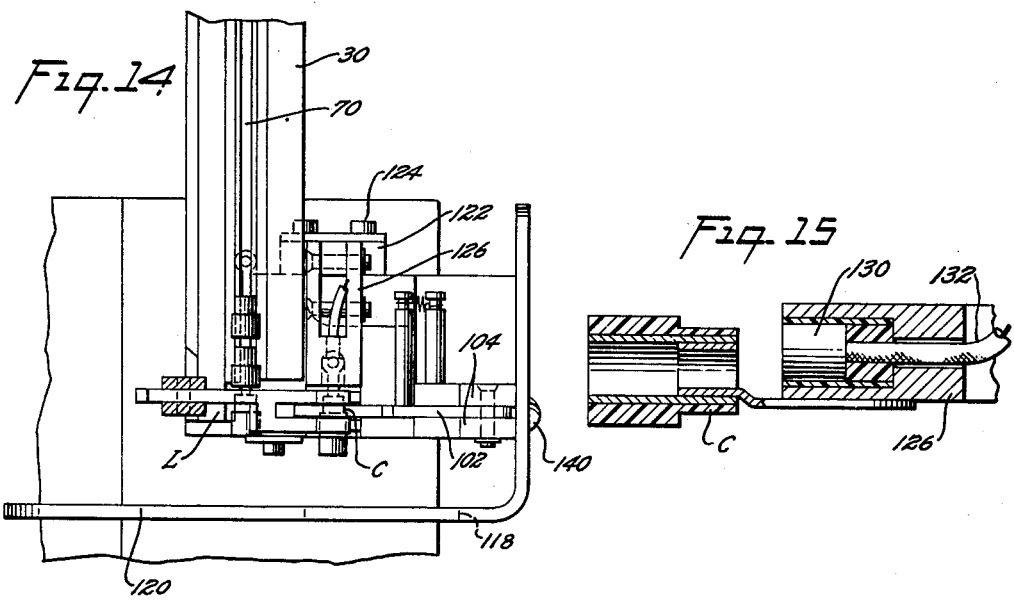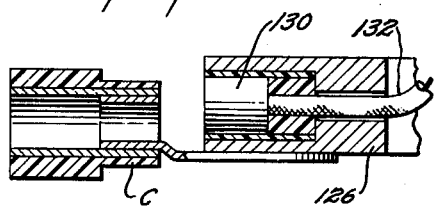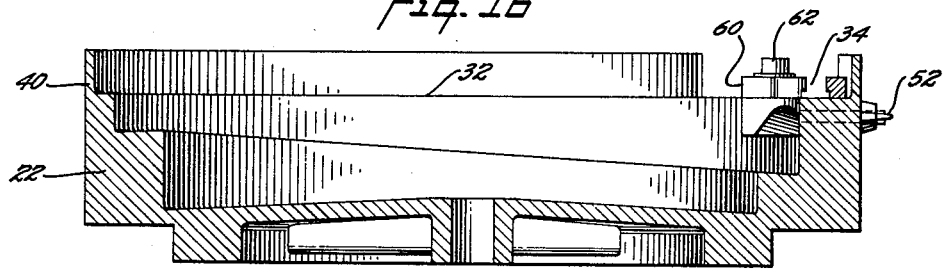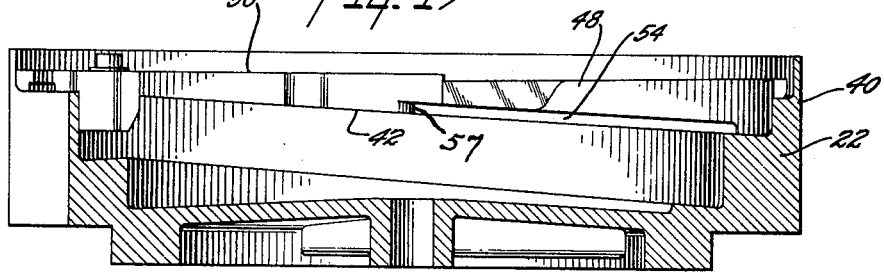

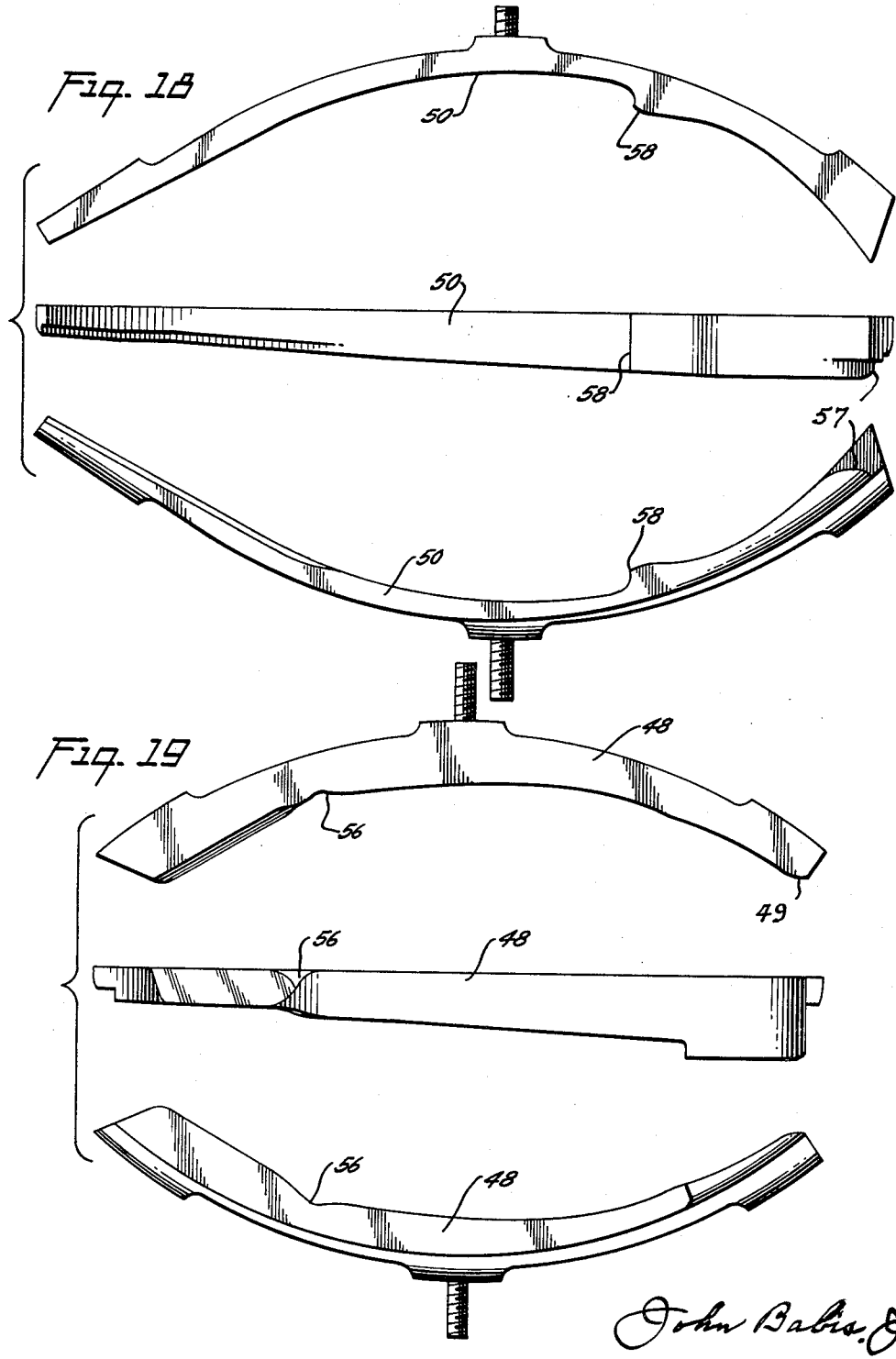

United States Patent Office 3,165,139
Patented Jan. 12, 1965

3,165,139
APPARATUS FOR ORIENTING, FEEDING AND CRIMPING INSULATED TERMINAL CONNECTORS
Robert U. Whitney, Jr., Livingston, N.J., assignor to The Thomas & Betts Co., Elizabeth, N.J., a corporation of New Jersey
Original application Mar. 13, 1959, Ser. No. 799,198, now Patent No. 3,084,780, dated Apr. 9, 1963. Divided and this application June 18, 1962, Ser. No. 203,239
4 Claims. (Cl. 153—1)

This application is a division of application Serial Number 799,198, filed on March 13, 1959, now Patent No. 3,084,780, issued April 9, 1963.

The invention relates to article-handling devices and more particularly to power-actuated apparatus for orienting, feeding and discharging a series of small articles of the character shown in Frey Patent 2,769,965, and for transferring, positioning and finally crimping said discharged articles in seriatim on a bare end portion of insulated wire conductors operatively positioned in said apparatus individually in succession by an operator.

More specifically, the invention resides in an automatic mechanism wherein provision is made for receiving a quantity of insulated terminal connectors in random fashion; for successively orienting and feeding such terminal connectors in predetermined linear relation along an arcuate path and into an inclined channel type dispensing rack or chute with their insulated annular ends first and overlying the flat apertured tongue portion of the preceding terminal connector in "piggy-back" fashion; for successively discharging the connectors from the inclined chute in seriatim onto a horizontal transfer station; for successively transferring each terminal connector laterally from the transfer station into position on an anvil die, including a reciprocal plunger die, constituting a crimping means; and for holding the terminal connector with its tongue portion in a horizontal plane prior to the operation of the reciprocal plunger die thereon in response to the insertion of a bare end portion of an insulated wire conductor through the wire barrel portion of the positioned terminal connector, whereby to contact a switch element for energizing a motor operable to rotate the mechanisms through one cycle of operation in which the positioned terminal connector is crimped on the inserted conductor end portion and subsequently withdrawn by an operator, another terminal connector having been moved into crimping position upon completion of the cycle for the subsequent insertion of another wire conductor through the next positioned terminal connector.

Insulated and non-insulated terminal connectors of the apertured tongue type, which are produced in strip form, are known, wherein adjacent pairs of connectors are joined by an integral residual metal web extending between the adjacent tongue portions, as in the case of strips of insulated terminal connectors, and by a similar residual metal web extending between the adjacent wire barrel portion of each pair of such terminal connectors, as in the case of strips of non-insulated connectors. It is also known that such strips of terminal connectors are also pre-tinned subsequent to the manufacture thereof, or otherwise provided with a suitable metallic film to protect the finished terminal connectors against corrosion.

Automatic crimping machines which are adapted for feeding thereto insulated or non-insulated terminal connectors in strip form and whereby such connectors are individually crimped on wire conductors and at the same time severed from the strip, are also known. However, the end-product produced by such machines from terminal connectors in strip form possessed certain disadvantages by reason of the fact that in the successive severing of each terminal connector from a strip thereof the tinned or other anti-corrosion metallic surface plated thereon is marred or mutilated to the extent that a portion of its base surface is exposed and thus thereafter subject to corrosion at such points of severance.

Accordingly, it is an object of the invention to provide a hopper feeding, orienting, positioning, holding and crimping mechanism which is particularly adapted for handling a quantity of separate, individually complete, insulated terminal connectors, which are not subject to the above-noted disadvantages.

A further object of the invention is to provide an automatic mechanism of the character specified, whereby the crimping of individually complete insulated terminal connectors on a bare end portion of a like number of insulated wire conductors may be performed at a rate which is compatible with the large number of conductors to be found in electrical circuit harness for electronic data processing machines, digital computers and the like.

Another object of the invention is to provide a hopper type orienting and feeding mechanism whereby individually complete insulated terminal connectors are fed to a supply chute and removed therefrom in seriatim and successively automatically positioned in predetermined relation to a crimping mechanism for securing each successively positioned connector on a bare end portion of an insulated wire conductor in response to the insertion thereof through each successively positioned terminal connector.

A further object of the invention is to provide a cyclically operable automatic mechanism which is adapted to be rendered operable by the intrusion thereinto of the bare end portion of an insulated wire conductor for crimping an individually complete insulated terminal connector thereon and for transferring another terminal connector into position for a subsequent crimping operation during each cycle of operation.

Another object of the invention is to provide a cyclically operable automatic mechanism which includes a vibratory hopper and an inclined chute connected therebetween, which is adapted for orienting and feeding individual insulated terminal connectors in predetermined partially superposed linear relation to said chute, and for transferring and positioning said terminal connectors in seriatim from said chute to a crimping mechanism, and for subsequently advancing another terminal connector to said crimping mechanism for a subsequent crimping operation during each cycle of operation.

With the above and other objects in view, the invention resides in the novel construction, combination and arrangement of parts, the novel features of which are set forth with particularity in the appended claims, the invention itself, however, both as to its organization and its method of operation, together with additional objects and advantages thereof, being best understood from the following description of a specific embodiment thereof when taken in connection with the accompanying drawings, in which:

FIG. 1 is a perspective view of the orienting, feeding and crimping mechanism embodying one form of the invention;

FIG. 1a is a view showing a conductor with a pair of terminal connectors crimped thereon by the apparatus set forth herein;

FIG. 2 is a front elevation of the mechanism shown in FIG. 1;

FIG. 3 is an end elevation of the mechanism as seen from the right of FIG. 2;

FIG. 4 is a top plan view of the vibratory hopper per se with the upper end of an inclined storage chute connected thereto;

FIG. 5 is a transverse fragmentary sectional view taken on the line 5—5 of FIG. 4, showing a terminal connector with its tongue down on the spiral track on the inner periphery of the hopper and in position to be oriented with its insulated wire barrel end in forward position;

FIG. 6 is a similar transverse fragmentary sectional view taken on the line 6—6 of FIG. 4, showing a terminal connector as advanced to the same position along the spiral track with its tongue uppermost, whereby the connector overhangs the relieved edge of the spiral track and is thus caused to fall by its own weight to the floor of the hopper bowl;

FIG. 7 is a fragmentary transverse sectional view taken on the line 7—7 of FIG. 4, showing the connector passage centrally of the storage chute;

FIG. 8 is a longitudinal fragmentary sectional view of the storage chute showing the manner in which the terminal connectors are oriented and fed thereinto in partially superposed "piggy-back" relation;

FIG. 9 is a fragmentary front elevation of the head end of the crimping mechanism in position for transferring a terminal connector at the bottom end of the storage chute to crimping position;

FIG. 10 is a similar view showing the position of the mechanism after the transfer of a terminal connector has been initiated;

FIG. 11 is a similar view showing the position of the mechanism after a terminal connector has been placed in crimping position and a pivoted, spring-influenced, hold-down lever released thereon;

FIG. 12 is a similar elevational view, partly in section, taken on the line 12—12 of FIG. 11, illustrating a side elevation of a terminal connector as moved to crimping position with its rearwardly extending tongue disposed in a horizontal plane in coactable relation with a circuit-shorting means;

FIG. 13 is an elevational view similar to FIG. 11, showing the mechanism at the end of a crimping operation on a terminal connector and transfer linkage returned to normal position for a subsequent transfer operation;

FIG. 14 is a transverse sectional view taken on the line 14—14 of FIG. 11;

FIG. 15 is an enlarged fragmentary sectional view illustrating the relative position of a terminal connector, as moved to crimping position, with respect to a motor circuit-shorting means substantially in co-axial alignment with the axial center of the wire barrel end portion of the terminal connector;

FIG. 16 is a transverse sectional view of the hopper feed bowl per se, taken on the line 16—16 of FIG. 4, illustrating the discharge gate and related guide block tangent with the uppermost peripheral edge of the hopper bowl;

FIG. 17 is a similar view taken on the line 17—17 of FIG. 4 and illustrating in side elevation, the relation of a pair of arcuate camming elements, secured on the inner periphery of the hopper bowl, to a spiral feed track and a slot formed therebetween by one of said camming elements;

FIG. 18 is a top, side and bottom elevational view of one of the arcuate camming members; and FIG. 19 is a top, side and bottom elevational view of the other one of the arcuate camming members.

Referring to the drawings and particularly to FIGS. 1, 2, and 3, the herein described terminal connector feeding, orienting and crimping apparatus, generally indicated at 20, comprises a vibratory hopper bowl 22, a cylically operable crimping machine 24, including an electric motor drive 26, embodying a conventional single revolution clutch 28 of the pin type, as manufactured by Alva-Allen Industries, Clinton, Missouri, and an inclined storage chute 30 therebetween with its lower end secured to the base of the crimping machine 24, and its upper end disposed in closely spaced relation to the bowl 22, a supply of insulated terminal connectors C of the wire barrel apertured tongue type being shown in the bowl 22 and storage chute 30 in their oriented, partially superposed position in which they are fed from the hopper bowl 22, and their wire barrel end foremost, to the crimping machine 24 by way of the inclined chute 30.

As best shown in FIG. 4, the hopper bowl 22 is provided on its inner periphery with a feed track or ramp 32, progressing upwardly from the floor of the bowl 22, in a spiral path through approximately one and one-half convolutions and terminating adjacent a portion of the interrupted upper edge thereof which is tangent to the true radius of the bowl to form an exit gate 34, with which the upper end of the inclined chute 30 is in spaced relation. The hopper bowl 22 is mounted on vibratory actuating device 36 which vibrates the bowl at one of several selected frequencies in such manner that it imparts a forward movement to the terminal connector C being fed counter-clockwise relative to the bowl 22. The actuating device 36 is of conventional form and known commercially as a "Syntron" vibratory feeder, and therefore need not be described.

In accordance with the invention, the hopper bowl 22 is provided with an elongated opening 38 through its peripheral wall 40 which slopes downwardly outwardly at an angle from the center of the track surface on the uppermost turn 42 of the feed track 22, shown in FIG. 6, the width of the track 32 at this point being accordingly, relatively narrower, and its outer free edge beveled at this point with an angular chamfer or flat as at 46, all for a purpose hereinafter described.

Further in accordance with the invention, and as best shown in FIG. 4, a pair of arcuate camming members 48 and 50 are secured, as by means of stud screws 52, on the inner periphery of the hopper bowl 22, the camming member 48 being positioned in spaced relation to the uppermost turn 42 of the feed track 32, to provide a narrow slot 54 therebetween adapted to receive the tongue portion of advancing terminal connectors C therein as they pass under the first camming member 48. The second camming member 50 is positioned on the uppermost turn 42 of the feed track or ramp 32, as clearly shown in FIG. 17.

In the movement of the terminal connector C on the feed track 32, as they approach the free beveled end 49 of the camming member 48, some connectors will be disposed tongue end foremost and on the track 32, others will be disposed wire barrel end foremost and some with the tongue end foremost but upside-down, that is, with the tongue portion spaced from the feed track 32. Accordingly, as the terminal connectors initially advance in these respective positions along the feed track 42, the tongue portion thereof will enter the slot 54 after each has passed the beveled end 49 of the first camming member 48, and move along until each reaches the dwell 56, formed in the side wall of the camming member 48, whereby each connector is turned to extend transversely of the track 42 or radially toward the center of the bowl 22, as clearly shown in FIGURES 5 and 6.

Thus, when a connector is in the position shown in FIG. 5, with its tongue portion down on the track 32 and extending into the slot 54, it will continue to move ahead in this position past the beveled or chamfered edge portion 46, by reason of its balanced position on the track 32, as indicated in broken lines, until its tongue portion strikes the curved underside end portion 57, of the camming member 50, whereby the connector C is turned with its barrel end portion foremost in which position it continues along the track to the chute 30, or if the upper end portion of the track 32 is occupied with connectors to the projection 58, succesive connectors will be biased off the track 32, by the projection 58, on the camming member 50.

When a connector moves along the track 32, with its tongue portion in "up-side down" position as clearly shown in FIG. 6, the connector will advance in this position until it reaches the beveled or chamfered edge portion 46, where it will become unbalanced by hanging down and fall off the track 32 into the bowl 22.

When the inclined storage chute 30 is full of terminal connectors disposed in partially superposed piggy-back relation, with their tongue portions in a horizontal plane, as exemplified in FIG. 8, and the continuous feed thereof by the vibratory hopper bowl 22 causes the line of terminal connectors to back up on the uppermost end portion of the spiral feed track 32 to the projection 58 provided on the side wall of the second camming member 50, all oriented terminal connectors advancing past the chamfered edge portion 46 of the spiral feed track 32 will, when they reach the projection 58, be biased thereby off the feed track 32, at this point, and to fall therefrom into the hopper bowl 22.

Further in accordance with the invention, the hopper bowl 22 is further provided at the exit or discharge end of the spiral feed track 32 therein, with a guide block or plate 60 secured as at 62 in spaced adjustable relation to one end portion of the camming member 50 and with one end thereof abutting the upper end face of the inclined chute 30, whereby to positively guide an advancing line of oriented terminal connectors C from the discharge end of the spiral feed track 32, into the upper end of the inclined chute 30, the adjustment of the guide block 60 providing for the accommodation of terminal connectors which differ in length and diameter within predetermined limits. For example, connectors having a maximum diameter of .219 inch, .240 inch and .260 inch, respectively, and an overall length of .819 inch, .910 inch and .984 inch, respectively.

As best shown in FIG. 7, the storage chute 30, comprises a base strip 64, a pair of strips 66 in spaced parallel relation, and a pair of spacer strips 68, disposed in spaced parallelism whereby a channel 70 is provided between the strips 66 for transporting a supply of terminal connectors by gravity feed, one of the strips 66 and one of the spacer strips 68 being foreshortened at the bottom end of the chute 30 to an extent substantially equal to the overall length of a terminal connector C whereby to provide for the lateral ejection of the lowermost terminal connector in the chute 30. As shown in FIG. 3, the lowermost end of the storage chute 30 is secured to a die block assembly 72 suitably secured on the bed plate 74 of an "Allen" type power-actuated press, by means of a suitable bracket 76, an upstanding stop plate 78 being suitably secured on the front face of the die block assembly in spaced central alignment with the bottom end of the chute 30, whereby terminal connectors are prevented from descending beyond the bottom end of the base strip 64 of the chute 30.

Further in accordance with the invention, a terminal connector transfer means for displacing the lowermost terminal connector at the bottom end of the chute 30 to a crimping position comprises an offset bracket 80 suitably secured to the head of the press in depending spaced parallelism with a reciprocable plunger 82 actuated by an eccentric drive connected to a rotatable shaft 84. The depending end of the bracket 80 is provided with a transverse stub shaft 86 carrying a crank arm 88, on its inner end for movement therewith, the crank arm 88 having an anti-friction roller 88' pivoted on its free end, the roller 88' being biased against one side of a transverse slot 89, provided in the lower end portion of the plunger 82, by a suitably anchored retractile spring S, as best shown in FIGS. 3 and 12, whereby the stub-shaft 86 is oscillated through a predetermined angle in response to reciprocatory movement of the plunger or ram 82.

Further in accordance with the invention, a rocker arm 90 pivotally mounting a transfer arm 92 on one end thereof and biased by means of a retractile spring 94 therebetween, as shown in FIGS. 9, 10, 11 and 13, is secured at its opposite end to the outer end of the stub shaft 86, the arrangement being such that the notched free end 96 of the transfer arm 92 normally rests on the left side L of the bottom end of the inclined chute 30, when the reciprocable plunger 82 is in down position, as in FIGS. 9 and 13.

Further in accordance with the invention, a complementary die block 100 is provided on the free end of the reciprocable plunger 82 and adapted to register with the anvil die 98 for crimping a terminal connector when positioned therebetween with its tongue portion disposed in a horizontal plane, and so held by means of a hold-down lever 102 pivotally mounted on an upstanding clevis arm 104 formed integral with the die block assembly 72 and biased into cooperative relation with the anvil die 98 by means of a retractile spring 106, as shown in FIG. 9, the free end of the hold down lever 102 being provided with a detent 108 and a V-notch 110 adjacent thereto in its bottom edge face adapted for straddling the wire barrel end of a terminal connector when in position on the anvil die 98.

Means for raising the pivoted hold-down lever 102 comprises a latch member 112 which is pivoted to the reciprocable plunger 82 in off-set depending relation, as at 114, and biased toward the plunger 82 in alignment with the hold-down lever 102 by means of a retractile spring 116, whereby when the plunger 82 descends toward the anvil die 98 the latch member 112 will engage the detent end 108 of the hold-down lever 102 for raising the lever 102 in response to upward movement of the plunger or ram 82, whereby to permit the free removal of a crimped terminal connector C from the anvil die 98, through a suitable opening 118 formed in a transparent plastic guard shield 120 suitably secured to the end face of the die block assembly 72, as at 122, to protect an operator against possible injury.

Further in accordance with the invention, means for automatically initiating operation of the crimping mechanism comprises an upstanding bracket 122 secured to the rear side of the die block assembly 72, as at 124, having a metallic arm 126 pivoted to its upper end and extending normal thereto toward the front face of the die block assembly 72 and normally held in this position by means of a suitably anchored, retractile spring 128, as best shown in FIGS. 12 and 14. As clearly shown in FIG. 15, a circuit-shorting contact member 130 is disposed in an axial bore provided therefor in the free end of the arm 126 in insulated relation, with an insulated conductor 132 suitably secured at one end to said contact member 130, and extending rearwardly and outwardly thereof to a circuit energizing means E. As clearly shown in FIG. 12, the pivoted arm 126 with its contact member 130 is disposed substantially in co-axial alignment with the axial center of the wire barrel portion of a terminal connector C, when disposed in crimping position on the fixed anvil die 98 forming part of the die block assembly 72, whereby when the bare end portion of an insulated wire conductor 132 is extended through the positioned terminal connector into engagement with the contact member 130, one cycle of operation will have been initiated. The contact carrying arm 126 is pivoted to the bracket 122 in spring biased relation to provide for the quick and easy removal of a terminal connector which may have become jammed thereunder.

*Operation*

With the apparatus shown and described at rest and devoid of a supply of terminal connectors, a quantity of connectors is deposited in the hopper bowl 22 and the vibratory mechanism and motor circuit energized by setting a plurality of toggle switches 136, 138 and 140, respectively, to "ON" position. The terminal connectors C in the hopper bowl 22 will begin feeding onto the spiral track 32 and subsequentially pass through the discharge gate 34 in oriented, partially superposed relation into the chute 30, with their tongue portions disposed in a horizontal plane. After a quantity of terminal connectors have been discharged into the chute 30, the first terminal connector at the bottom end thereof is transferred to the anvil die 98 by initiating movement of the crimping mechanism. This is effected by passing the bare end portion of an insulated wire conductor 134 over the anvil die 98 and into contact with the motor circuit-shorting contact 130, whereby the crimping mechanism operates through one cycle during which the rocker arm 90 and transfer arm 92 are actuated, in response to the upward movement of the plunger or ram 82 from down position, and the terminal connector at the bottom of the chute 30 transferred into position on the anvil die 98 by the transfer arm 92, and so held by the arm 92 and the hold-down lever 102, the mechanism having operated through a full cycle and come to rest.

Subsequently, the operator inserts the bare-end portion of a wire conductor through the wire barrel portion of the terminal connector C in position on the anvil die 98 and into contact with the circuit-shorting contact 130, whereby another cycle of operation is initiated in which the plunger die 100 closes on the anvil die 98 to crimp the positioned terminal connector on the inserted bare end portion of the wire conductor 134. During the downward movement of the plunger die 100 on the aforesaid positioned terminal connector, the transfer arm 92 is returned to position at the bottom end of the chute 30, to transfer the next lowermost terminal connector into position on the anvil die 98. In this movement, the previously crimped terminal connector is displaced to the right of the anvil die 98 by the next advancing terminal connector if the operator has not already removed the same by withdrawing the wire conductor 134 forwardly through the transversely elongated opening 118 provided in the upstanding transparent plastic guard shield 120 having the form of an L in cross-section, with its short leg side secured to the die block assembly 72, as at 122.

While the invention has been illustrated and described with respect to one embodiment thereof, it is to be expressly understood that various changes and modifications may be made therein without departing from the inventive concept underlying the same. Therefore, the invention herein disclosed is not to be limited in scope except as is necessitated by the prior art and the definition of the appended claims.

I claim:

1. A cyclically operable crimping machine for crimping wire barrel, terminal connectors on the end portion of a wire conductor comprising a pair of relatively moveable and engageable crimping elements, one of said elements having an anvil configurated for receiving the wire barrel portion of a connector in position for crimping against the other element when said elements are engaged, means for moving said elements in and out of engagement, means for successively and singly feeding connectors into position on said anvil when said elements move to disengaged position, a connector holddown arm for securing the connector against said anvil while a wire is inserted into its wire barrel, means for moving said holddown arm into connector securing position when a connector is placed into received position on said anvil, and latch means on the other said element for moving said holddown arm from said securing position after the crimping cycle when said elements move from engaged to disengaged position to free the crimped connector.

2. A crimping machine as in claim 1 and wherein said holddown comprises an arm having a V-shaped slot therein engageable with a connector on said anvil when in securing position, said arm being stationarily pivotably mounted relative to said members, spring biased to securing position and having a detent thereon, said latch means on the other element engaging said detent to pull said arm out of securing position when said elements move from engaging position and to releasing said detent when said elements reach disengaged position whereby said arm moves back to holding position to maintain the next connector moved onto said anvil.

3. A cyclically operable crimping machine for crimping wire barrel type terminal connectors on bare end portions of wire conductors comprising a pair of relatively movable and engageable crimping dies, means for moving said dies into and out of crimping engagement in a single cyclic operation including a single revolution clutch, means for successively feeding and positioning terminal connectors in crimping position between said dies and removing crimped connectors therefrom when said dies are disengaged, an electrically responsive actuator on said clutch for causing it to engage and operate said dies through a single cycle, a normally open electric circuit connected to said actuator for operating same, two terminals in said circuit which when bridged, close same to operate said actuator, one of said terminals being located so as to be adjacent to and in substantially co-axial alignment with the barrel of a connector in crimping position, the other of said terminals being located so as to be in contact with a connector when in crimping position, whereby when a bare conductor end is inserted through the wire barrel portion of said connector, electrical contact is established between said terminals thereby closing said circuit and tripping said clutch to cause a cycle of operation of said dies, said wire being removed from contact with said one terminal when the crimped connector is removed from crimping position by said connector removing means.

4. A cyclically operable crimping machine for crimping terminal connectors on bare end portions of wire conductors comprising a pair of relatively movable and engageable crimping dies, means for moving said dies into and out of crimping engagement in a single cyclic operation to crimp and then release a terminal connector positioned therebetween, means for successively feeding and positioning terminal connectors in crimping position between said dies, and means for initiating action of said die moving means and said means for feeding connectors through a single cyclic operation, said initiating means comprising an electrical circuit for energizing a motor for driving said die moving means, said circuit being normally open and including two terminals, which when bridged, close said circuit, said terminals being located relative to said connector in crimping position and in the path of conductor insertion whereby said terminals are bridged by said conductor end portion when placed in position to be crimped to said connector.

References Cited in the file of this patent

UNITED STATES PATENTS

| | | |
|---|---|---|
| 2,340,448 | Andren | Feb. 1, 1944 |
| 2,783,813 | Duks | Mar. 5, 1957 |
| 3,037,545 | Klinger et al. | June 5, 1962 |
| 3,056,446 | Schmidt | Oct. 2, 1962 |